(12) United States Patent
Narukawa (10) Patent No.: US 10,330,214 B2
(45) Date of Patent: Jun. 25, 2019

(54) CONTROL VALVE

(71) Applicant: FUJIKOKI CORPORATION, Tokyo (JP)

(72) Inventor: Bunta Narukawa, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 170 days.

(21) Appl. No.: 15/689,000

(22) Filed: Aug. 29, 2017

(65) Prior Publication Data

US 2018/0066765 A1 Mar. 8, 2018

(30) Foreign Application Priority Data

Sep. 2, 2016 (JP) .................................. 2016-171480

(51) Int. Cl.
| | |
|---|---|
| *F16K 11/10* | (2006.01) |
| *F16K 27/04* | (2006.01) |
| *F25B 41/06* | (2006.01) |
| *F16K 31/122* | (2006.01) |

(52) U.S. Cl.
CPC ............ *F16K 31/122* (2013.01); *F16K 11/10* (2013.01); *F16K 27/04* (2013.01); *F25B 41/062* (2013.01); *F25B 2341/061* (2013.01); *F25B 2341/0653* (2013.01); *F25B 2600/2505* (2013.01); *Y02B 30/72* (2013.01)

(58) Field of Classification Search
CPC ....... Y10T 137/86614; Y10T 137/7842; F16K 31/22; F16K 11/10; F16K 27/04; F25B 41/062; F25B 2341/061; F25B 2341/0653; F25B 2600/2505; Y02B 30/72
See application file for complete search history.

(56) References Cited

U.S. PATENT DOCUMENTS

| | | | | |
|---|---|---|---|---|
| 1,507,073 A | * | 9/1924 | Lewis ................... | F25B 41/062 137/505.3 |
| 1,555,075 A | * | 9/1925 | Pownall ................ | F25B 41/062 137/15.01 |
| 2,319,993 A | * | 5/1943 | Kaufman .............. | F25B 41/062 236/48 R |
| 2,792,019 A | * | 5/1957 | Lieser ................. | F15B 13/0402 137/625.25 |
| 3,450,345 A | * | 6/1969 | Orth ...................... | F25B 41/062 236/92 B |

(Continued)

FOREIGN PATENT DOCUMENTS

| | | |
|---|---|---|
| JP | S49-5718 U | 1/1974 |
| JP | 2004-308909 A | 11/2004 |

*Primary Examiner* — Marina A Tietjen
*Assistant Examiner* — Frederick D Soski
(74) *Attorney, Agent, or Firm* — Bacon & Thomas, PLLC (57) ABSTRACT

[Object] Provided is a control valve capable of ensuring controllability in both flows without increasing the number of parts.

[Solving Means] A plurality of differential pressure valves 50, 60, 70, and 80 are disposed inside a valve body 10 so that a fluid pressure acting on a main valve body 20 disposed inside a main valve chamber 13 becomes the same in a flow of both directions including one direction from a first inlet/outlet 11 to a second inlet/outlet 12 through the main valve chamber 13 and the other direction from the second inlet/outlet 12 to the first inlet/outlet 11 through the main valve chamber 13.

6 Claims, 4 Drawing Sheets

(56) References Cited

U.S. PATENT DOCUMENTS

| | | | | |
|---|---|---|---|---|
| 3,556,145 A * | 1/1971 | Sugden, Jr. | F01B 17/00 | 137/596.15 |
| 3,670,768 A * | 6/1972 | Griswold | F16K 11/10 | 137/606 |
| 3,965,923 A * | 6/1976 | Allen | F16K 11/10 | 137/315.03 |
| 4,342,421 A * | 8/1982 | Widdowson | F25B 41/062 | 236/92 B |
| 4,362,027 A * | 12/1982 | Barbier | F25B 41/04 | 236/75 |
| 4,459,819 A * | 7/1984 | Hargraves | F25B 41/062 | 251/129.08 |
| 4,546,795 A * | 10/1985 | Okamoto | F16K 31/0648 | 137/624.15 |
| 4,614,327 A * | 9/1986 | Valbjorn | F16K 31/0689 | 236/92 B |
| 4,632,358 A * | 12/1986 | Orth | B60H 1/00485 | 251/117 |
| 4,896,860 A * | 1/1990 | Malone | F16K 3/24 | 251/129.05 |
| 4,928,494 A * | 5/1990 | Glamm | F16K 31/04 | 137/901 |
| 5,252,939 A * | 10/1993 | Riefler | F16K 31/0655 | 251/129.15 |
| 5,524,819 A * | 6/1996 | Heffner | F25B 41/062 | 236/92 B |
| 5,544,857 A * | 8/1996 | Torrence | F16K 3/265 | 251/129.15 |
| 5,588,590 A * | 12/1996 | Sakakibara | F25B 41/04 | 137/614 |
| 5,605,318 A * | 2/1997 | Malone | F16K 31/0668 | 251/129.15 |
| 5,611,370 A * | 3/1997 | Najmolhoda | F16K 31/0613 | 137/625.61 |
| 6,148,631 A * | 11/2000 | Watanabe | F25B 41/003 | 181/196 |
| 6,220,571 B1 * | 4/2001 | Kim | F16K 31/047 | 251/129.11 |
| 6,233,956 B1 * | 5/2001 | Katayama | F25B 41/04 | 62/197 |
| 6,254,059 B1 * | 7/2001 | Kurosawa | F16K 31/0655 | 137/15.18 |
| 6,315,266 B1 * | 11/2001 | Hirota | F16K 31/406 | 251/30.01 |
| 6,367,506 B1 * | 4/2002 | Takagi | F16K 11/10 | 137/119.03 |
| 6,375,085 B1 * | 4/2002 | Martin | F25B 41/062 | 236/92 B |
| 6,405,743 B1 * | 6/2002 | Spryshak | F16K 31/0689 | 137/1 |
| 6,418,737 B1 * | 7/2002 | Kuroki | F24H 4/04 | 62/156 |
| 6,481,229 B1 * | 11/2002 | Yajima | F25B 41/062 | 236/84 |
| 6,561,480 B1 * | 5/2003 | Komiya | F16K 1/38 | 251/122 |
| 6,581,397 B1 * | 6/2003 | Taira | F25B 9/002 | 62/199 |
| 6,701,744 B1 * | 3/2004 | Yajima | F16K 31/0693 | 62/502 |
| 7,533,684 B1 * | 5/2009 | Dalton, Jr. | F16K 11/10 | 137/240 |
| 10,240,835 B2 * | 3/2019 | Ohta | F25B 49/02 | |
| 2001/0009099 A1 * | 7/2001 | Kobayashi | F16K 31/002 | 62/204 |
| 2002/0023462 A1 * | 2/2002 | Kato | F25B 41/062 | 62/527 |
| 2003/0000586 A1 * | 1/2003 | Hirota | F16K 11/044 | 137/625.43 |
| 2003/0010832 A1 * | 1/2003 | Kramer | F16K 31/0655 | 236/92 B |
| 2003/0019225 A1 * | 1/2003 | Breyer | F16K 31/406 | 62/225 |
| 2003/0151011 A1 * | 8/2003 | Hirota | F16K 31/406 | 251/30.01 |
| 2003/0201413 A1 * | 10/2003 | Hirota | F25B 41/062 | 251/30.01 |
| 2004/0007015 A1 * | 1/2004 | Sendo | F25B 41/062 | 62/527 |
| 2004/0011980 A1 * | 1/2004 | Hirota | F16K 31/0693 | 251/129.07 |
| 2004/0036044 A1 * | 2/2004 | Hirota | F25B 41/062 | 251/30.02 |
| 2004/0046140 A1 * | 3/2004 | Hirota | F25B 41/062 | 251/129.08 |
| 2004/0129008 A1 * | 7/2004 | Dianetti | F25B 41/062 | 62/222 |
| 2004/0195532 A1 | 10/2004 | Barber et al. | | |
| 2004/0211477 A1 * | 10/2004 | Ezaki | F16K 31/423 | 137/877 |
| 2005/0056050 A1 * | 3/2005 | Hirota | F16K 31/0651 | 62/527 |
| 2005/0097920 A1 * | 5/2005 | Ezaki | F25B 41/062 | 62/527 |
| 2006/0043325 A1 * | 3/2006 | Umezawa | F16K 31/047 | 251/129.11 |
| 2006/0150650 A1 * | 7/2006 | Murase | F25B 41/062 | 62/222 |
| 2006/0219965 A1 * | 10/2006 | Hirota | F25B 41/062 | 251/30.02 |
| 2007/0068194 A1 * | 3/2007 | Ise | F25B 41/062 | 62/527 |
| 2007/0181196 A1 * | 8/2007 | Sturman | F15B 13/0433 | 137/625.64 |
| 2008/0023661 A1 * | 1/2008 | Gu | F16K 7/17 | 251/30.01 |
| 2008/0203339 A1 * | 8/2008 | Kato | F16K 31/061 | 251/65 |
| 2009/0019871 A1 * | 1/2009 | Yukimoto | F25B 41/062 | 62/222 |
| 2009/0272442 A1 * | 11/2009 | Fishwick | F15B 13/0405 | 137/487.5 |
| 2009/0288434 A1 * | 11/2009 | Lou | F25B 41/062 | 62/222 |
| 2009/0294713 A1 * | 12/2009 | Harada | F16K 31/04 | 251/129.15 |
| 2010/0000244 A1 * | 1/2010 | Kawakatsu | F25B 41/062 | 62/210 |
| 2010/0005819 A1 * | 1/2010 | Kawakatsu | F25B 41/062 | 62/225 |
| 2011/0023513 A1 * | 2/2011 | Hamel | F16K 31/047 | 62/211 |
| 2011/0120161 A1 * | 5/2011 | Hayashi | F25B 41/062 | 62/160 |
| 2011/0139260 A1 * | 6/2011 | Dornbach | F16K 27/041 | 137/12 |
| 2012/0187202 A1 * | 7/2012 | Suzuki | F25B 41/062 | 236/92 B |
| 2012/0199771 A1 * | 8/2012 | Kasagi | F16K 31/0613 | 251/129.15 |
| 2012/0241024 A1 * | 9/2012 | Arai | F16K 31/406 | 137/487.5 |
| 2013/0206851 A1 * | 8/2013 | Sekiguchi | F16K 31/04 | 236/92 B |
| 2013/0263955 A1 * | 10/2013 | Hirota | F16K 31/04 | 137/636 |
| 2013/0313461 A1 * | 11/2013 | Tonegawa | F25B 41/062 | 251/318 |
| 2013/0333782 A1 * | 12/2013 | Schnittger | B60T 13/662 | 137/583 |
| 2014/0175315 A1 * | 6/2014 | Lv | F25B 41/062 | 251/282 |
| 2014/0245778 A1 * | 9/2014 | Suzuki | F25B 41/062 | 62/528 |
| 2014/0290772 A1 * | 10/2014 | Itou | F25B 41/062 | 137/625.12 |

(56) References Cited

U.S. PATENT DOCUMENTS

| | | | | |
|---|---|---|---|---|
| 2014/0291562 A1* | 10/2014 | Ooe | F16K 31/04 |
| | | | | 251/129.11 |
| 2015/0048266 A1* | 2/2015 | Shen | F16K 31/02 |
| | | | | 251/69 |
| 2015/0059893 A1* | 3/2015 | Nishiyama | F16K 11/10 |
| | | | | 137/596.1 |
| 2015/0083257 A1* | 3/2015 | Shiota | F25B 41/062 |
| | | | | 137/625.48 |
| 2015/0096630 A1* | 4/2015 | Ogawa | F16K 31/406 |
| | | | | 137/487.5 |
| 2015/0276082 A1* | 10/2015 | Harada | F16K 31/02 |
| | | | | 251/129.01 |
| 2015/0300213 A1* | 10/2015 | Kaufmann | F16K 11/10 |
| | | | | 137/625.42 |
| 2015/0337980 A1* | 11/2015 | Oikawa | F16K 31/426 |
| | | | | 137/625.48 |
| 2016/0052365 A1* | 2/2016 | Kohigashi | B60H 1/00921 |
| | | | | 165/202 |
| 2016/0084397 A1* | 3/2016 | Boban | F16K 31/0613 |
| | | | | 137/238 |
| 2016/0131403 A1* | 5/2016 | Andoh | F16K 27/029 |
| | | | | 62/160 |
| 2016/0146366 A1* | 5/2016 | Takahashi | F16K 31/048 |
| | | | | 251/129.15 |
| 2016/0290525 A1* | 10/2016 | Hotta | F25B 41/062 |
| 2016/0313037 A1* | 10/2016 | Takahashi | F25B 41/062 |
| 2016/0341336 A1* | 11/2016 | Harada | F25B 41/062 |
| 2017/0211850 A1* | 7/2017 | Fukushima | F25B 43/00 |
| 2017/0307267 A1* | 10/2017 | Landenberger | F25B 41/062 |
| 2017/0328594 A1* | 11/2017 | Takeichi | F24F 11/83 |
| 2018/0023847 A1* | 1/2018 | Nagano | F04B 39/04 |
| | | | | 62/500 |
| 2018/0038512 A1* | 2/2018 | Mitsu | F16K 1/123 |
| 2018/0202696 A1* | 7/2018 | Satake | F25B 41/062 |
| 2018/0306474 A1* | 10/2018 | Uribe | F16K 31/002 |

* cited by examiner

FIG. 3

CONTROL VALVE

TECHNICAL FIELD

The present invention relates to a control valve such as an electric valve or an electromagnetic valve which is used as a flow control valve while being assembled to a refrigeration cycle of an air conditioner, a refrigerator, or the like.

BACKGROUND ART

As an example of this kind of control valve, there is known an electromagnetic valve in which a differential pressure valve for releasing a passage when a front/rear differential pressure is equal to or higher than a predetermined pressure is provided in an inflow passage or an outflow passage with respect to a main valve body (for example, see Patent Document 1 below).

In the above-described conventional electromagnetic valve, a fluid flow direction inside the valve is defined to one direction (a direction from the inflow passage to the outflow passage) by the differential pressure valve provided in the inflow passage or the outflow passage.

CITATION LIST

Patent Document

Patent Document 1: JP H11-193976A

SUMMARY OF THE INVENTION

Problem to be Solved by the Invention

Incidentally, the above-described electromagnetic valve is not contrived to allow a flow in both directions. For this reason, when the electromagnetic valve is used while being assembled to a refrigeration cycle of an air conditioner, there is a need to install the electromagnetic valves in parallel while changing its directions in order to cope with a change in flow direction of the fluid (the refrigerant) due to a change in cycle operation mode or to install a plurality of differential pressure valves or a plurality of electromagnetic valves inside the cycle to control the flow direction of the fluid (the refrigerant).

Further, a method of using the electromagnetic valve in both flows by omitting the differential pressure valve in the inflow passage or the outflow passage can be considered. However, the above-described electromagnetic valve cannot be used while allowing the fluid to flow in the opposite direction (a direction from the outflow passage to the inflow passage). For that reason, when a pressure difference (a differential pressure) between a pressure near the outflow passage and a pressure near the inflow passage becomes equal to or higher than an expected value under a situation in which the passage is closed by the main valve body, for example, in a reverse flow state, an urging force of a plunger spring urging (a plunger including) a main valve body in a valve closing direction surrenders to a differential pressure applied to the main valve body so that the valve is opened. As a result, there is concern that controllability may be degraded.

The invention has been made in view of the above-described circumstances and an object of the invention is to provide a control valve capable of ensuring controllability in both flows without increasing the number of parts.

Means for Solving Problem

In order to attain the above-described object, a control valve according to the invention basically includes: a valve body which is provided with a main valve chamber and first and second inlet/outlets and in which a bottom portion opening and first and second side portion openings are opened to the main valve chamber; a main valve body which is disposed in the main valve chamber to be elevatable relative to the bottom portion opening in order to control a flow rate of a fluid flowing in the bottom portion opening; and an elevation drive source which elevates the main valve body relative to the bottom portion opening, wherein differential pressure valves operated in response to a front/rear differential pressure are respectively disposed between the first inlet/outlet and the first side portion opening, between the second inlet/outlet and the second side portion opening between the first inlet/outlet and the bottom portion opening, and between the second inlet/outlet and the bottom portion opening inside the valve body so that a fluid pressure acting on the main valve body becomes the same in a flow in both directions including one direction from the first inlet/outlet to the second inlet/outlet through the main valve chamber and the other direction from the second inlet/outlet to the first inlet/outlet through the main valve chamber.

In a desirable aspect, a first side portion differential pressure valve allowing a fluid to flow only in a direction from the first inlet/outlet to the first side portion opening or the opposite direction in response to a differential pressure between the first inlet/outlet and the first side portion opening is disposed between the first inlet/outlet and the first side portion opening inside the valve body, a second side portion differential pressure valve allowing a fluid to flow only in a direction from the second inlet/outlet to the second side portion opening or the opposite direction in response to a differential pressure between the second inlet/outlet and the second side portion opening is disposed between the second inlet/outlet and the second side portion opening inside the valve body, a first bottom portion differential pressure valve allowing a fluid to flow only in a direction from the bottom portion opening to the first inlet/outlet or the opposite direction in response to a differential pressure between the first inlet/outlet and the bottom portion opening is disposed between the first inlet/outlet and the bottom portion opening inside the valve body, and a second bottom portion differential pressure valve allowing a fluid to flow only in a direction from the bottom portion opening to the second inlet/outlet or the opposite direction in response to a differential pressure between the second inlet/outlet and the bottom portion opening is disposed between the second inlet/outlet and the bottom portion opening inside the valve body.

In a more detailed desirable aspect, a control valve includes: a valve body which is provided with a main valve chamber and first and second inlet/outlets and in which an outlet is opened to a bottom portion of the main valve chamber and first and second inlets are opened to a side portion of the main valve chamber; a main valve body which is disposed in the main valve chamber to be elevatable relative to the outlet in order to control a flow rate of a fluid flowing in the outlet; and an elevation drive source which elevates the main valve body relative to the outlet, wherein a first side portion differential pressure valve allowing a fluid to flow only in a direction from the first inlet/outlet to the first inlet in response to a differential pressure between the first inlet/outlet and the first inlet is disposed between the first inlet/outlet and the first inlet inside the valve body, a second side portion differential pressure valve allowing a fluid to flow only in a direction from the second inlet/outlet to the second inlet in response to a differential pressure between the second inlet/outlet and the second inlet is disposed between the second inlet/outlet and the second inlet inside the valve body, a first bottom portion differential pressure valve allowing a fluid to flow only in a direction from the outlet to the first inlet/outlet in response to a differential pressure between the outlet and the first inlet/outlet is disposed between the outlet and the first inlet/outlet inside the valve body, and a second bottom portion differential pressure valve allowing a fluid to flow only in a direction from the outlet to the second inlet/outlet in response to a differential pressure between the outlet and the second inlet/outlet is disposed between the outlet and the second inlet/outlet inside the valve body so that a fluid pressure acting on the main valve body becomes the same in a flow in both directions including one direction from the first inlet/outlet to the second inlet/outlet through the main valve chamber and the other direction from the second inlet/outlet to the first inlet/outlet through the main valve chamber.

In a desirable aspect, valve bodies of the first and second side portion differential pressure valves are moved in the same direction as the movement direction of the main valve body and valve bodies of the first and second bottom portion differential pressure valves are moved in a direction orthogonal to the movement direction of the main valve body.

In another more detailed desirable aspect, a control valve includes: a valve body which is provided with a main valve chamber and first and second inlet/outlets and in which an inlet is opened to a bottom portion of the main valve chamber and first and second outlets are opened to a side portion of the main valve chamber; a main valve body which is disposed in the main valve chamber to be elevatable relative to the inlet in order to control a flow rate of a fluid flowing in the inlet; and an elevation drive source which elevates the main valve body relative to the inlet, wherein a first bottom portion differential pressure valve allowing a fluid to flow only in a direction from the first inlet/outlet to the inlet in response to a differential pressure between the first inlet/outlet and the inlet is disposed between the first inlet/outlet and the inlet inside the valve body, a second bottom portion differential pressure valve allowing a fluid to flow only in a direction from the second inlet/outlet to the inlet in response to a differential pressure between the second inlet/outlet and the inlet is disposed between the second inlet/outlet and the inlet inside the valve body, a first side portion differential pressure valve allowing a fluid to flow only in a direction from the first outlet to the first inlet/outlet in response to a differential pressure between the first outlet and the first inlet/outlet is disposed between the first outlet and the first inlet/outlet inside the valve body, and a second side portion differential pressure valve allowing a fluid to flow only in a direction from the second outlet to the second inlet/outlet in response to a differential pressure between the second outlet and the second inlet/outlet is disposed between the second outlet and the second inlet/outlet inside the valve body so that a fluid pressure acting on the main valve body becomes the same in a flow of both directions including one direction from the first inlet/outlet to the second inlet/outlet through the main valve chamber and the other direction from the second inlet/outlet to the first inlet/outlet through the main valve chamber.

In a desirable aspect, valve bodies of the first and second bottom portion differential pressure valves are moved in the same direction as the movement direction of the main valve body and valve bodies of the first and second side portion differential pressure valves are moved in a direction orthogonal to the movement direction of the main valve body.

Effect of the Invention

According to the invention, since a plurality of differential pressure valves are disposed to be assembled inside the valve body so that a fluid pressure acting on the main valve body disposed inside the main valve chamber becomes the same in a flow of both directions including one direction from the first inlet/outlet to the second inlet/outlet through the main valve chamber and the other direction from the second inlet/outlet to the first inlet/outlet through the main valve chamber, it is possible to prevent a problem in which the main valve body performs an operation (an opening/closing operation) different from the control due to the differential pressure (the fluid pressure) applied to the main valve body. For that reason, it is possible to ensure controllability in both flows without increasing the number of parts.

MODE(S) FOR CARRYING OUT THE INVENTION

Hereinafter, embodiments of the invention will be described with reference to the drawings.

In the present specification, descriptions representing positions and directions like up and down, left and right, and the like are given for the convenience of the drawings in order to avoid complicated explanation, and do not indicate positions and directions in an actual use state.

Further, in each drawing, in order to help the comprehension of the invention and the drawing, a gap formed between members, a separation distance between the members, and the like are larger or smaller than the dimension of each component.

First Embodiment

Figure 1:
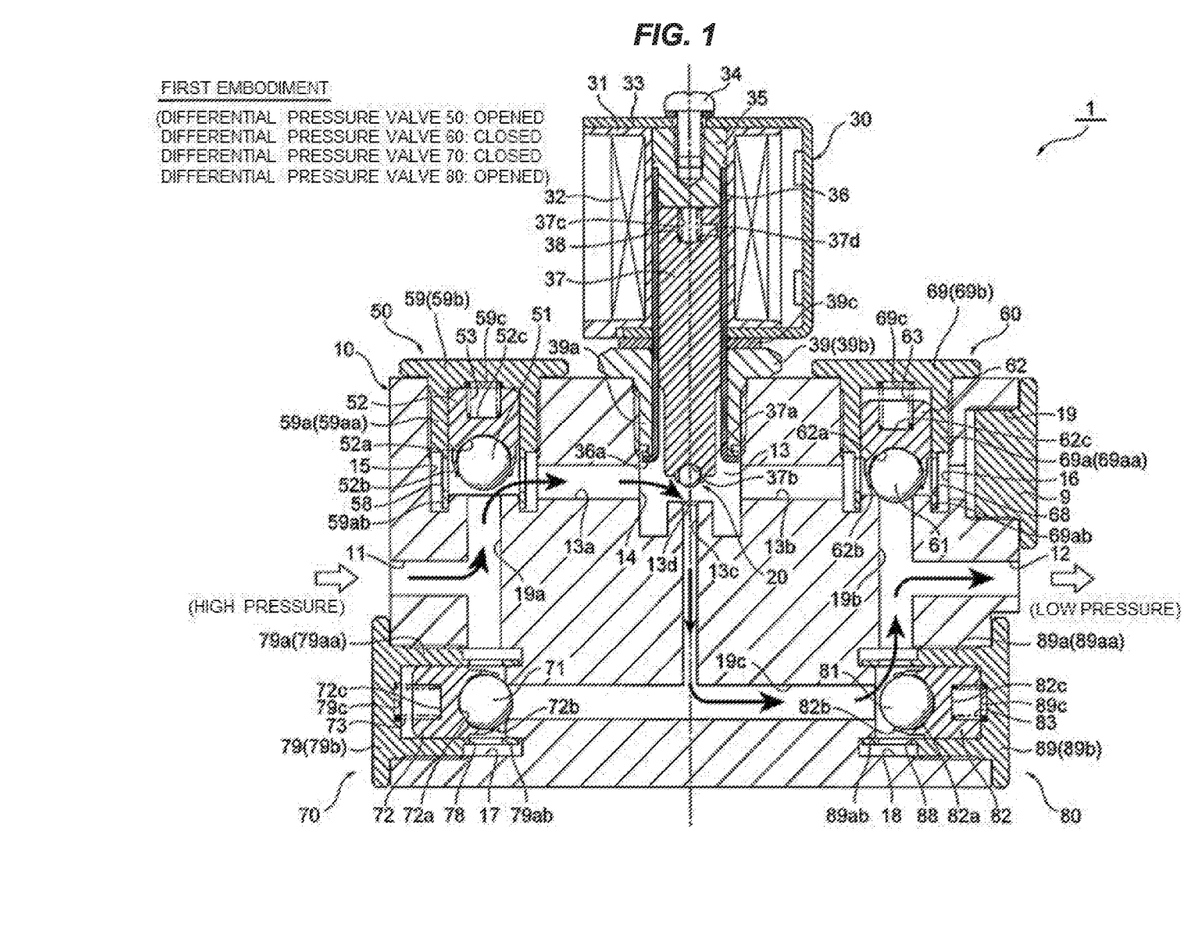
FIG. 1 is a longitudinal sectional view showing a first embodiment (an electromagnetic valve) of a control valve according to the invention and is a diagram showing a state where a fluid flows in one direction (a direction from a first inlet/outlet to a second inlet/outlet)
Figure 2:
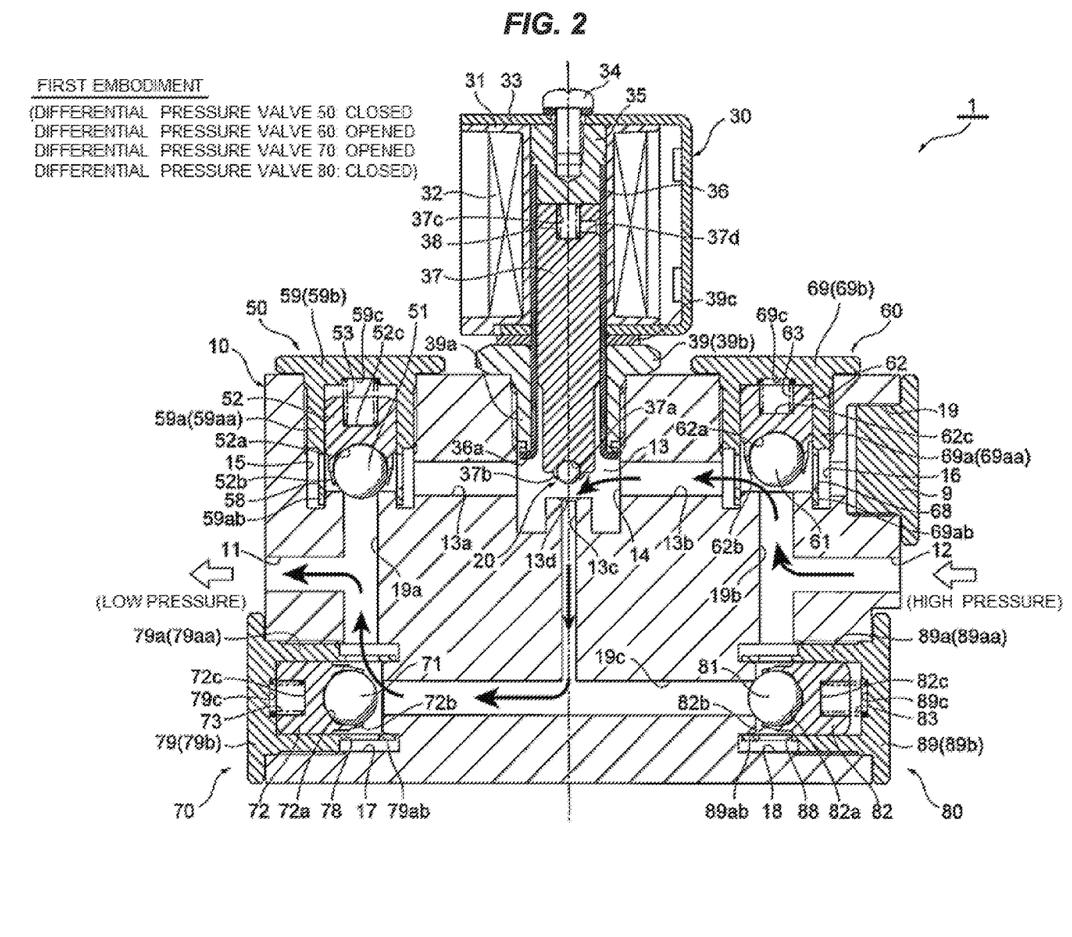
FIG. 2 is a longitudinal sectional view showing the first embodiment (the electromagnetic valve) of the control valve according to the invention and is a diagram showing a state where a fluid flows in the other direction (a direction from the second inlet/outlet to the first inlet/outlet)

FIGS. 1 and 2 are longitudinal sectional views showing an electromagnetic valve which is a first embodiment of a control valve according to the invention, FIG. 1 is a diagram showing a state where a fluid flows in one direction (a direction from a first inlet/outlet to a second inlet/outlet), and FIG. 2 is a diagram showing a state where a fluid flows in the other direction (a direction from the second inlet/outlet to the first inlet/outlet).

A control valve (an electromagnetic valve) 1 of the embodiment shown in the drawings is used while being assembled to, for example, a refrigeration cycle of an air conditioner using a $CO_2$ refrigerant and mainly includes a valve body 10 which is formed of, for example, metal, a ball type main valve body 20, an electromagnetic actuator (an elevation drive source) 30 which elevates the main valve body 20 by an electromagnetic force, and four differential pressure valves 50, 60, 70, and 80.

<Configuration of Valve Body 10>

The valve body 10 is provided with two inlet/outlets (a first inlet/outlet 11 and a second inlet/outlet 12), a main valve chamber 13 in which the main valve body 20 is disposed to be elevatable, a first inlet (a first side portion opening) 13a which is opened to a left side portion of the main valve chamber 13 and is connected to the first inlet/outlet 11, a second inlet (a second side portion opening) 13b which is opened to a right side portion of the main valve chamber 13 and is connected to the second inlet/outlet 12, and an outlet (a bottom portion opening) 13c which is opened to the bottom portion of the main valve chamber 13 and is connected to the first inlet/outlet 11 and the second inlet/outlet 12.

Specifically, the valve body 10 has a substantially rectangular shape in the longitudinal sectional view, a mounting hole 14 which is formed as a concave hole having a circular cross-section is provided in the vicinity of a center of an upper surface side among four side surfaces (a left surface, a right surface, an upper surface, and a lower surface), and attachment holes 15 and 16 which are respectively formed as concave holes each having a circular cross-section in the vertical direction are respectively opened to the left and right sides of the upper surface side (the left and right sides of the mounting hole 14). Further, the first inlet/outlet 11 which is formed as a rightward lateral hole is provided in the vicinity of the center of the left surface side of the valve body 10, an attachment hole 17 which is formed as a concave hole having a circular cross-section in the lateral direction is opened to the lower portion of the left surface side, the second inlet/outlet 12 which is formed as a leftward lateral hole is provided in the vicinity of the center of the right surface side of the valve body 10, and an attachment hole 18 which is formed as a concave hole having a circular cross-section in the lateral direction is opened to the lower portion of the right surface side.

Female threads for attaching and fixing (a holder member 39 of) an electromagnetic actuator 30 and (valve body holders 59, 69, 79, and 89 of) differential pressure valves 50, 60, 70, and 80 are formed at the inner peripheries of (the opening portions of) the mounting hole 14 and the attachment holes 15 to 18 and (the male thread of) the holder member 39 holding the electromagnetic actuator 30 is threaded into (the female thread of) the mounting hole 14 so that the lower portion of the mounting hole 14 is provided with the main valve chamber 13 in which the main valve body 20 is disposed to be elevatable.

Further, the first inlet 13a and the second inlet 13b which are respectively formed as lateral holes are respectively provided between (the lower left side portion of) the mounting hole 14 (that is, the left portion of the main valve chamber 13) and (the lower right portion of) the left attachment hole 15 and between (the lower right portion of) the mounting hole 14 (that is, the right portion of the main valve chamber 13) and (the lower left portion of) the right attachment hole 16 of the valve body 10. Also, a vertical hole 19a which is connected to (intersects) the first inlet/outlet 11 is provided between (the bottom center portion of) the attachment hole 15 and (the right upper portion of) the attachment hole 17 and a vertical hole 19b which is connected to (intersects) the second inlet/outlet 12 is provided between (the bottom center portion of) the attachment hole 16 and (the left upper portion of) the attachment hole 18.

The outlet 13c formed as a vertical hole and having an upper end formed as a valve seat 13d to and from which the main valve body 20 moves is provided at the center of (a convex portion provided in) the bottom portion of the mounting hole 14 and a lateral hole 19c which is connected to (intersects) the outlet 13c is provided between (the bottom center portion of) the attachment hole 17 provided at the lower portion of the valve body 10 and (the bottom center portion of) the attachment hole 18.

Further, in this example, in order to form the first inlet 13a and the second inlet 13b formed in the lateral direction and opened to the mounting hole 14 (the main valve chamber 13), a large-diameter hole 19 (a concave hole having a diameter larger than those of the first inlet 13a and the second inlet 13b) is formed at the upper portion (a portion having the substantially same height as those of the first inlet 13a and the second inlet 13b) of the right surface side of the valve body 10 and the first inlet 13a and the second inlet 13b are formed in a straight line (the same axis) through (the lower portion of) the attachment hole 16 from (the lower portion of the bottom portion of) the large-diameter hole 19. (A male thread formed in an outer periphery of) a lid member attached closing member 9 having a convex cross-section is fixed to (a female thread formed in an inner periphery of) the large-diameter hole 19 by threading.

In this example, the first inlet/outlet 11, the second inlet/outlet 12, the vertical hole 19a connected to the first inlet/outlet 11, the vertical hole 19b connected to the second inlet/outlet 12, the lateral hole 19c, the first inlet 13a, and the second inlet 13b are formed to have the substantially same diameter and the outlet 13c is formed to have a diameter slightly smaller than those of the first inlet 13a and the second inlet 13b.

<Configuration of Electromagnetic Actuator 30 Including Main Valve Body 20>

The electromagnetic actuator 30 is disposed above the valve body 10.

The electromagnetic actuator 30 mainly includes a bobbin 31, an energization excitation coil 32 which is disposed at the outside of the bobbin 31, a housing 33 which is disposed to cover the outer periphery of the coil 32, an attractor 35 which is disposed at the inner periphery of the upper portion of the coil 32, is fixed to the housing 33 by a bolt 34, and has a bottomed cylindrical or columnar shape, a guide pipe 36 of which an upper end is fixed to an outer peripheral step portion of the attractor 35 by welding or the like, and a stepped oval columnar plunger 37 which is fitted into the guide pipe 36 to be slidable, a holding hole 37a is provided at the lower end of the plunger 37 (the front end near the valve body 10), and the main valve body 20 which is formed as a ball is fixed to the holding hole 37a by caulking while a part of the lower surface is exposed (a caulked portion 37b). Further, the upper portion of the plunger 37 facing the attractor 35 is provided with a vertical hole 37c which forms a spring chamber and a lateral hole 37d which communicates with the vertical hole 37c and is a uniform pressure hole and a plunger spring 38 which is formed as a compression coil spring and urges (the main valve body 20 provided in) the plunger 37 in the valve closing direction (downward) is provided inside the vertical hole 37c.

The guide pipe 36 extends to the lower side of the housing 33, a cylindrical holder member 39 attached with a flanged cover portion 39b is externally inserted into the lower portion of the lower portion of the guide pipe 36 with a disc-shaped member 39c interposed therebetween, and the holder member 39 is held and fixed by a flange-shaped locking portion 36a provided at the lower end of the guide pipe 36. That is, the holder member 39 is sandwiched between the housing 33 and the flange-shaped locking portion 36a of the guide pipe 36 with the disc-shaped member 39c interposed therebetween.

A male thread is formed at the outer periphery of the cylindrical portion 39a of the holder member 39 and the male thread of (the cylindrical portion 39a of) the holder member 39 is threaded into the female thread of the mounting hole 14 provided in the valve body 10 so that the electromagnetic actuator 30 is disposed and fixed above the valve body 10 (in a vertical posture).

In the electromagnetic actuator 30 with the above-described configuration, the plunger 37 moves (is elevated) in the vertical direction when a current is supplied to the coil 32 and the main valve body 20 provided at the front end of the plunger 37 moves close to and away from the valve seat 13d provided in the outlet 13c (opens and closes the outlet 13c) so that a flow rate of a fluid (a refrigerant) flowing in the outlet 13c is controlled.

<Configurations of Differential Pressure Valves 50, 60, 70, and 80>

Since the differential pressure valves 50, 60, 70, and 80 (the first side portion differential pressure valve 50, the second side portion differential pressure valve 60, the first bottom portion differential pressure valve 70, and the second bottom portion differential pressure valve 80) attached to the attachment holes 15, 16, 17, and 18 respectively have the substantially same configuration, the differential pressure valve 50 will be representatively described below. Additionally, in the differential pressure valves 60, 70, and 80, portions having the same functions and effects as those of the differential pressure valve 50 are denoted by the same reference numerals (reference numerals obtained by adding 10, 20, and 30 to the reference numerals of the portions of the differential pressure valve 50).

The differential pressure valve 50 allows a fluid to flow only in a direction from the first inlet/outlet 11 to the first inlet 13a in response to a differential pressure (that is, a differential pressure between the first inlet/outlet 11 and the first inlet 13a) before and after the attachment hole 15, more specifically, at a time when a pressure near the first inlet/outlet 11 is higher than a pressure near the first inlet 13a by a predetermined value or more and basically includes a cylindrical valve body holder 59 attached with a lid member 59b inserted into the attachment hole 15 and a columnar piston 52 which is disposed in the cylindrical portion 59a of the valve body holder 59 (in the vertical direction) to be slidable. Here, a holding hole 52a is provided at the front end of the piston 52 and a valve body (a differential pressure valve body) 51 which is formed as a ball having a diameter slightly smaller than that of the piston 52 is received while a part of the lower surface is exposed and is fixed to the holding hole 52a by caulking (a caulked portion 52b). Further, concave spring bearing holes 52c and 59c are respective formed at an upper surface of the piston 52 (a surface near the lid member 59b) and a lower surface of the lid member 59b of the valve body holder 59 (a surface near the piston 52) and a closing spring 53 which is formed as a compression coil spring and urges (the valve body 51 provided in) the piston 52 in the valve closing direction (downward) is loaded in a compressed state between (the bottom surface of) the spring bearing hole 52c of the piston 52 and (the bottom surface of) the spring bearing hole 59c of the lid member 59b of the valve body holder 59.

The cylindrical portion 59a of the valve body holder 59 includes a thick cylindrical portion 59aa having a large outer diameter and a thin cylindrical portion 59ab having a small outer diameter in a direction from the lid member 59b, a male thread is formed at the outer periphery of the thick cylindrical portion 59aa, and a plurality of (in the example shown in the drawings, four at the same interval) penetration holes 58 are formed at the thin cylindrical portion 59ab. When the male thread of (the thick cylindrical portion 59aa of the cylindrical portion 59a of) the valve body holder 59 is threaded into the female thread of the attachment hole 15 provided in the valve body 10, the differential pressure valve 50 is attached and fixed to the valve body 10.

Additionally, in the example shown in the drawings, the lower end of the thin cylindrical portion 59ab of the cylindrical portion 59a of the valve body holder 59 is positioned while being fitted to the outside of the convex portion formed at the bottom portion of the attachment hole 15.

In the differential pressure valve 50 with the above-described configuration, when a pressure near the first inlet/outlet 11 is lower than a pressure near the first inlet 13a (when a fluid flows in a direction from the second inlet/outlet 12 to the first inlet/outlet 11), the valve body 51 provided in the piston 52 is pressed against (the upper end of) the vertical hole 19a opened to the bottom portion of the attachment hole 15 by (the urging force of) the closing spring 53 so that a passage between the first inlet/outlet 11 and the first inlet 13a is closed.

Meanwhile, when a pressure near the first inlet/outlet 11 becomes higher than a pressure near the first inlet 13a (a predetermined value or more) so that the differential pressure applied to the valve body 51 overcomes the urging force of the closing spring 53 (when a fluid flows in a direction from the first inlet/outlet 11 to the second inlet/outlet 12), the piston 52 moves upward against the urging force of the closing spring 53, the valve body 51 provided in the piston 52 moves away from (the upper end of) the vertical hole 19a opened to the bottom portion of the attachment hole 15, and the passage between the first inlet/outlet 11 and the first inlet 13a is opened. Accordingly, a fluid flows from the first inlet/outlet 11 to the first inlet 13a (that is, the main valve chamber 13) through the upper portion of the vertical hole 19a, the inside of the cylindrical portion 59a of the valve body holder 59 inside the attachment hole 15, a penetration hole 58, and the like.

That is, (the valve body 51 in) the differential pressure valve 50 can be selectively located at an opening position of allowing the inflow of a fluid in a direction from the first inlet/outlet 11 to the first inlet 13a and a closing position of prohibiting (preventing) the inflow of a fluid in a direction from the first inlet/outlet 11 to the first inlet 13a in response to the differential pressure between the first inlet/outlet 11 and the first inlet 13a.

Additionally, also in the differential pressure valve 60 attached to the attachment hole 16, similarly to the differential pressure valve 50, a fluid flows only in a direction from the second inlet/outlet 12 to the second inlet 13b in response to a differential pressure before and after the attachment hole 16 (that is, a differential pressure between the second inlet/outlet 12 and the second inlet 13b), more specifically, at a time point in which a pressure near the second inlet/outlet 12 is higher than a pressure near the second inlet 13*b* by a predetermined value or more and (a valve body 61 in) the differential pressure valve 60 can be selectively located at an opening position of allowing the inflow of a fluid in a direction from the second inlet/outlet 12 to the second inlet 13*b* and a closing position of prohibiting (preventing) the inflow of a fluid in a direction from the second inlet/outlet 12 to the second inlet 13*b* in response to the differential pressure between the second inlet/outlet 12 and the second inlet 13*b*.

Further, also in the differential pressure valve 70 attached to the attachment hole 17, similarly to the differential pressure valve 50, a fluid flows only in a direction from the outlet 13*c* to the first inlet/outlet 11 in response to a differential pressure before and after the attachment hole 17 (that is, a differential pressure between the outlet 13*c* and the first inlet/outlet 11), more specifically, at a time point in which a pressure near the outlet 13*c* is higher than a pressure near the first inlet/outlet 11 by a predetermined value or more and (a valve body 71 of) the differential pressure valve 70 can be selectively located at an opening position of allowing the inflow of a fluid in a direction from the outlet 13*c* to the first inlet/outlet 11 and a closing position of prohibiting (preventing) the inflow of a fluid in a direction from the outlet 13*c* to the first inlet/outlet 11 in response to the differential pressure between the outlet 13*c* and the first inlet/outlet 11.

Further, also in the differential pressure valve 80 attached to the attachment hole 18, similarly to the differential pressure valve 50, a fluid flows only in a direction from the outlet 13*c* to the second inlet/outlet 12 in response to a differential pressure before and after the attachment hole 18 (that is, a differential pressure between the outlet 13*c* and the second inlet/outlet 12), more specifically, at a time point in which a pressure near the outlet 13*c* is higher than a pressure near the second inlet/outlet 12 by a predetermined value or more and (a valve body 81 in) the differential pressure valve 80 can be selectively located at an opening position of allowing the inflow of a fluid in a direction from the outlet 13*c* to the second inlet/outlet 12 and a closing position of prohibiting (preventing) the inflow of a fluid in a direction from the outlet 13*c* to the second inlet/outlet 12 in response to the differential pressure between the outlet 13*c* and the second inlet/outlet 12.

<Operation of Electromagnetic Valve 1>

In the electromagnetic valve 1 with the above-described configuration, when a fluid flows in a direction (one direction) from the first inlet/outlet 11 (the high pressure side) to the second inlet/outlet 12 (the low pressure side), a pressure near the first inlet/outlet 11 becomes higher than a pressure near the first inlet 13*a* (the main valve chamber 13) or a pressure near the outlet 13*c* (the main valve chamber 13) and a pressure near the second inlet/outlet 12 becomes lower than a pressure near the second inlet 13*b* (the main valve chamber 13) or a pressure near the outlet 13*c* (the main valve chamber 13). For that reason, (the valve body 51 in) the differential pressure valve 50 provided in the attachment hole 15 and (the valve body 81 in) the differential pressure valve 80 provided in the attachment hole 18 are set to the opening position and (the valve body 61 in) the differential pressure valve 60 provided in the attachment hole 16 and (the valve body 71 in) the differential pressure valve 70 provided in the attachment hole 17 are set to the closing position.

Thus, a fluid (a refrigerant) introduced from the first inlet/outlet 11 flows into the mounting hole 14 (the main valve chamber 13) through the upper portion of the vertical hole 19*a*, the inside of the attachment hole 15 (the inside of the cylindrical portion 59*a* of the valve body holder 59 and the penetration hole 58), and the first inlet 13*a* formed as a lateral hole. When the outlet 13*c* is opened, the fluid flows to the second inlet/outlet 12 through the outlet 13*c* formed as a vertical hole, the right portion of the lateral hole 19*c*, the inside of the attachment hole 18 (the inside of the cylindrical portion 89*a* of the valve body holder 89 and the penetration hole 88), and the lower portion of the vertical hole 19*b* (a state shown in FIG. 1).

Meanwhile, when a fluid flows in a direction (the other direction) from the second inlet/outlet 12 (the high pressure side) to the first inlet/outlet 11 (the low pressure side), a pressure near the first inlet/outlet 11 becomes lower than a pressure near the first inlet 13*a* (the main valve chamber 13) or a pressure near the outlet 13*c* (the main valve chamber 13) and a pressure near the second inlet/outlet 12 becomes higher than a pressure near the second inlet 13*b* (the main valve chamber 13) or a pressure near the outlet 13*c* (the main valve chamber 13). For that reason, (the valve body 51 in) the differential pressure valve 50 provided in the attachment hole 15 and (the valve body 81 in) the differential pressure valve 80 provided in the attachment hole 18 are set to the closing position and (the valve body 61 in) the differential pressure valve 60 provided in the attachment hole 16 and (the valve body 71 in) the differential pressure valve 70 provided in the attachment hole 17 are set to the opening position.

Thus, a fluid (a refrigerant) introduced from the second inlet/outlet 12 flows into the mounting hole 14 (the main valve chamber 13) through the upper portion of the vertical hole 19*b*, the inside of the attachment hole 16 (the inside of the cylindrical portion 69*a* of the valve body holder 69 and the penetration hole 68), and the second inlet 13*b* formed as a lateral hole. When the outlet 13*c* is opened, the fluid flows to the first inlet/outlet 11 through the outlet 13*c* formed as a vertical hole, the left portion of the lateral hole 19*c*, the inside of the attachment hole 17 (the inside of the cylindrical portion 79*a* of the valve body holder 79 and the penetration hole 78), and the lower portion of the vertical hole 19*a* (a state shown in FIG. 2).

In this way, in the control valve (the electromagnetic valve) 1 of the embodiment, since the plurality of differential pressure valves (check valves) 50, 60, 70, and 80 are disposed to be assembled in the valve body 10 so that the fluid pressure acting on the main valve body 20 disposed inside the main valve chamber 13 has the same direction (lateral→down) in the flow of both directions including one direction from the first inlet/outlet 11 to the second inlet/outlet 12 through the main valve chamber 13 and the other direction from the second inlet/outlet 12 to the first inlet/outlet 11 through the main valve chamber 13, it is possible to prevent a problem in which the main valve body 20 performs an operation (an opening/closing operation) different from the control due to the differential pressure (the fluid pressure) acting on the main valve body 20, for example, even when a pressure difference between the first inlet/outlet 11 and the second inlet/outlet 12 is large. For that reason, it is possible to ensure controllability in both flows without increasing the number of parts.

Further, in the embodiment, since the valve bodies 51 and 61 of the differential pressure valves 50 and 60 are moved in the vertical direction (that is, the same direction as the movement direction of the main valve body 20) and the valve bodies 71 and 81 of the differential pressure valves 70 and 80 are moved in the lateral direction (that is, a direction orthogonal to the movement direction of the main valve body 20) (in an opposed state), there is an effect that the valve body 10 can be decreased in size and the configuration of the electromagnetic valve 1 can be simplified.

Second Embodiment

Figure 3:
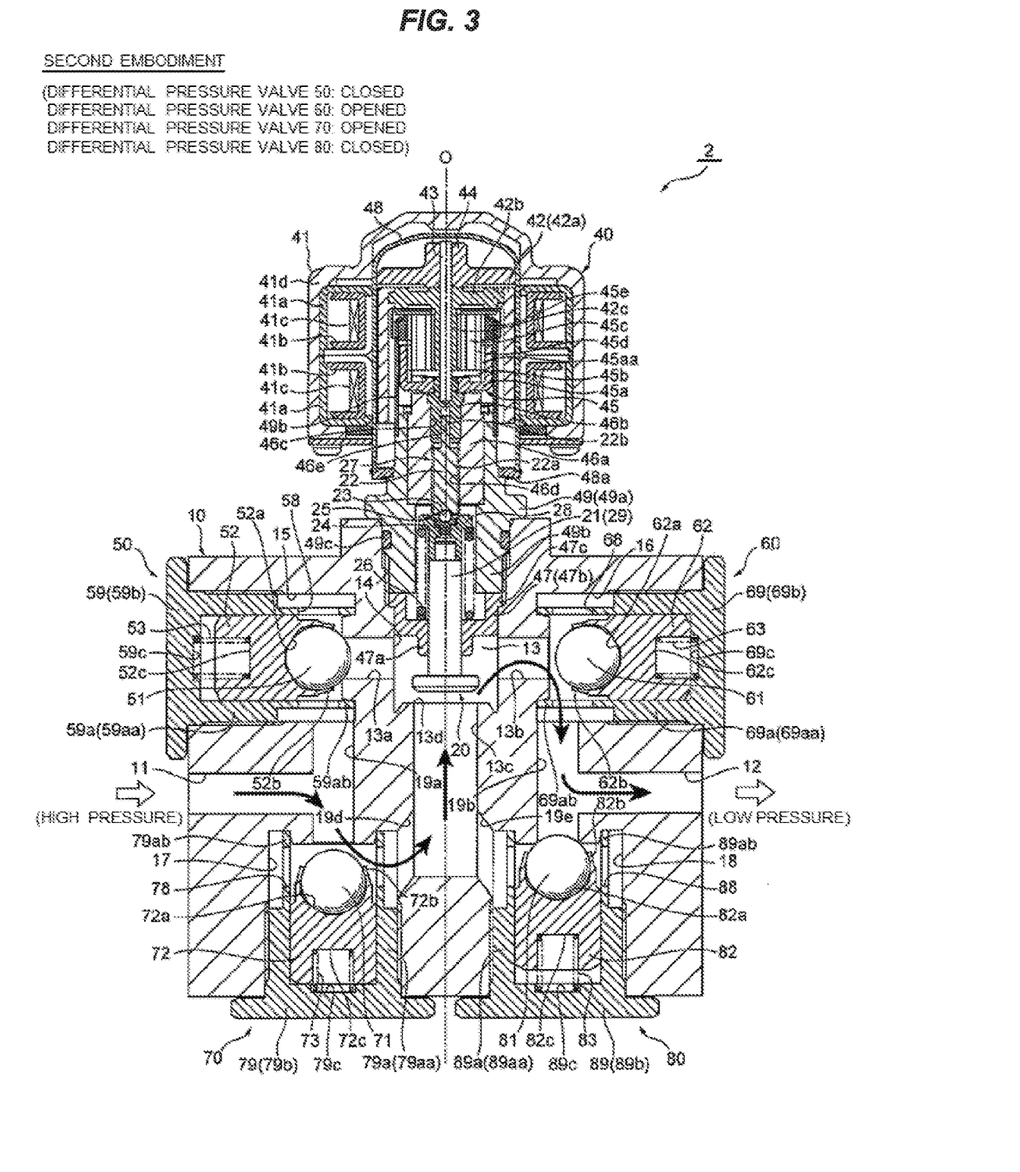
FIG. 3 is a longitudinal sectional view showing a second embodiment (an electric valve) of the control valve according to the invention and is a diagram showing a state where a fluid flows in one direction (a direction from a first inlet/outlet to a second inlet/outlet)
Figure 4:
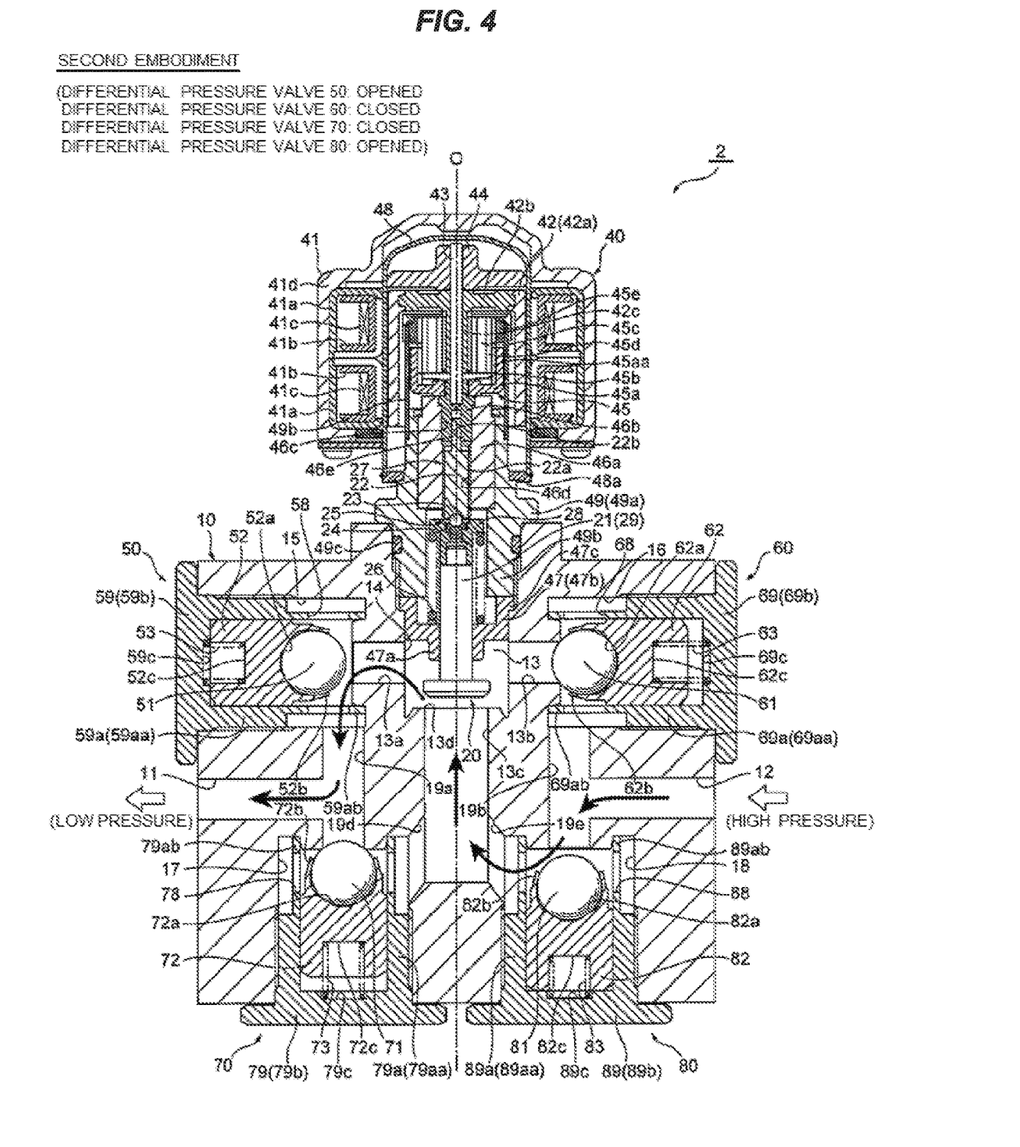
FIG. 4 is a longitudinal sectional view showing the second embodiment (the electric valve) of the control valve according to the invention and is a diagram showing a state where a fluid flows in the other direction (a direction from the second inlet/outlet to the first inlet/outlet).

FIGS. 3 and 4 are longitudinal sectional views showing an electric valve which is a second embodiment of the control valve according to the invention, FIG. 3 is a diagram showing a state where a fluid flows in one direction (a direction from the first inlet/outlet to the second inlet/outlet), and FIG. 4 is a diagram showing a state where a fluid flows in the other direction (a direction from the second inlet/outlet to the first inlet/outlet).

Further, in an electric valve 2 of the second embodiment, the same reference numerals are given to the parts having the same functions as those of the parts of the electromagnetic valve 1 of the first embodiment.

Similarly to the electromagnetic valve 1 of the first embodiment, the control valve (the electric valve) 2 is used while being assembled to, for example, a refrigeration cycle of an air conditioner using a $CO_2$ refrigerant and mainly includes the valve body 10 which is formed of, for example, metal, the flat main valve body 20, a stepping motor (an elevation drive source) 40 which elevates the main valve body 20, and four differential pressure valves 50, 60, 70, and 80.

<Configuration of Valve Body 10>

The valve body 10 is provided with two inlet/outlets (the first inlet/outlet 11 and the second inlet/outlet 12), the main valve chamber 13 in which the main valve body 20 is disposed to be elevatable, the first outlet (the first side portion opening) 13a which is opened to the left side portion of the main valve chamber 13 and is connected to the first inlet/outlet 11, the second outlet (the second side portion opening) 13b which is opened to the right side portion of the main valve chamber 13 and is connected to the second inlet/outlet 12, and the inlet (the bottom portion opening) 13c which is opened to the bottom portion of the main valve chamber 13 and is connected to the first inlet/outlet 11 and the second inlet/outlet 12.

Specifically, the valve body 10 has a substantially rectangular shape in the longitudinal sectional view and the mounting hole 14 which is formed as a stepped concave hole having a circular cross-section is provided in the vicinity of a center of an upper surface side among four side surfaces (a left surface, a right surface, an upper surface, and a lower surface). Further, the first inlet/outlet 11 which is formed as a rightward lateral hole is provided in the vicinity of the center of the left surface side of the valve body 10, the attachment hole 15 which is formed as a concave hole having a circular cross-section in the lateral direction is opened to the upper portion of the left surface side (the left side of the mounting hole 14), the second inlet/outlet 12 which is formed as a leftward lateral hole is provided in the vicinity of the center of the right surface side of the valve body 10, and the attachment hole 16 which is formed as a concave hole having a circular cross-section in the lateral direction is opened to the upper portion of the right surface side (the right side of the mounting hole 14). Further, the attachment holes 17 and 18 which are respectively formed as concave holes each having a circular cross-section in the vertical direction are opened to the left and right sides of the lower surface side of the valve body 10.

The inner peripheries of the mounting hole 14 and (the opening portions of) the attachment holes 15 to 18 are provided with female threads for attaching and fixing (the holder member 49 of) the stepping motor 40 and (the valve body holders 59, 69, 79, and 89 of the differential pressure valves 50, 60, 70, and 80). Then, (the male thread of) the holder member 49 holding the stepping motor 40 is threaded into (the female thread of) the mounting hole 14 (here, in a state where the valve shaft support member 47 is sandwiched), the lower portion of the mounting hole 14 is provided with the main valve chamber 13 in which the main valve body 20 is disposed to be elevatable.

Further, the first outlet 13a and the second outlet 13b which are respectively formed as lateral holes are provided between (the lower left side portion of) the mounting hole 14 (that is, the left side portion of the main valve chamber 13) and (the bottom center portion of) the left attachment hole 15 and between (the lower right side portion of) the mounting hole 14 (that is, the right side portion of the main valve chamber 13) and (the bottom center portion of) the right attachment hole 16 of the valve body 10. Also, the vertical hole 19a which is connected to (intersects) the first inlet/outlet 11 is provided between (the right lower portion of) the attachment hole 15 and (the bottom center portion of) the attachment hole 17 and the vertical hole 19b which is connected to (intersects) the second inlet/outlet 12 is provided between (the left lower portion of) the attachment hole 16 and (the bottom center portion of) the attachment hole 18.

The outlet 13c formed as a vertical hole and having an upper end formed as the valve seat 13d to and from which the main valve body 20 moves is provided at the center of (a convex portion provided in) the bottom portion of the mounting hole 14 and (the right side portion of) the attachment hole 17 and (the left side portion of) the attachment hole 18 provided at the lower portion the valve body 10 are respectively provided with a relatively short slant hole 19d rising to the right side and a slant hole 19e rising to the left side are provided so as to be connected to (the lower portion of) the outlet 13c.

In this example, the first inlet/outlet 11, the second inlet/outlet 12, the vertical hole 19a connected to the first inlet/outlet 11, the vertical hole 19b connected to the second inlet/outlet 12, the first outlet 13a, and the second outlet 13b are formed to have the substantially same diameter and the inlet 13c and the slant hole 19d and the slant hole 19e connected to the inlet 13c are formed to have a diameter slightly larger than those of the first outlet 13a and the second outlet 13b.

Further, in this example, the valve body 10 (including the differential pressure valves 50, 60, 70, and 80 to be described later) is formed to be substantially bilaterally symmetrical to each other.

<Configuration of Stepping Motor 40 with Main Valve Body 20>

The stepping motor 40 is disposed above the valve body 10.

The lower portion (a fitting portion 49b at the lower side of a lid portion 49a) of the stepped cylindrical holder member 49 in which the lid portion 49a formed as an annular protrusion portion is formed at the outer periphery of the middle portion is inserted into the mounting hole 14 of the valve body 10 and a covered cylindrical can 48 is fixed to the holder member 49 through an annular base plate 48a. The base plate 48a is fixed to (the step portion of) the holder member 49 and a lower end of the covered cylindrical can 48 is sealed and bonded to (the outer peripheral step portion of) the base plate 48a by butt welding or the like.

The stepping motor 40 includes a stator 41 which is fitted to the outside of the can 48 and a rotor 42 which is disposed at the inner periphery of the can 48 to be rotatable.

The stator 41 attached to the outer periphery of the can 48 includes a yoke 41a, a bobbin 41b, a coil 41c, a resin mold cover 41d, and the like and the rotor 42 supported at the inside of the can 48 to be rotatable (without any vertical movement) has a configuration in which a cylindrical rotor member 42a formed of a magnetic material is integrally connected to a sun gear member 42b formed of a resin material. A shaft 43 is inserted into the center portion of the sun gear member 42b and the upper portion of the shaft 43 is supported by a support member 44 disposed at the inside of the top portion of the can 48.

The sun gear 42c of the sun gear member 42b engages with a plurality of planetary gears 45d rotatably supported by a shaft 45c provided at a carrier 45b placed on a bottom surface of an output gear 45a. The upper half portion of the planetary gear 45d engages with an annular ring gear (an inner tooth fixed gear) 45e caulk-attached to the upper portion of the cylindrical member 49b fixed to the upper portion of the holder member 49 and the lower half portion of the planetary gear 45d engages with an inner tooth gear 45aa of the annular output gear 45a. The number of teeth of the ring gear 45e is set to be different from the number of teeth of the inner tooth gear 45aa of the output gear 45a. Accordingly, the rotation speed of the sun gear is reduced at a large speed reduction ratio and is transmitted to the output gear 45a (such a gear configuration will be referred to as a so-called mechanical paradox planetary gear reduction mechanism 45).

The output gear 45a contacts the upper surface of the cylindrical bearing member 46a in a slidable manner, the upper portion of the stepped cylindrical output shaft 46b is press-inserted into the bottom center portion of the output gear 45a, and the lower portion of the output shaft 46b is rotatably inserted into a fitting hole 46c formed at the center upper half portion of the bearing member 46a. Further, the lower portion of the shaft 43 is fitted into the upper portion of the output shaft 46b.

A valve shaft 21 includes a screw driving member (which is also referred to as a driver) 22, a stepped cylindrical thrust transmission shaft 28, and a stepped axial connection shaft 29 having an upper small-diameter portion fitted and fixed to the lower portion of the thrust transmission shaft 28, and the flat main valve body 20 is integrally formed at the lower end of the connection shaft 29 (that is, the lower end of the valve shaft 21).

The male thread 22a which is provided at (the outer periphery of) the screw driving member 22 constituting the valve shaft 21 is threaded into the female thread 46d provided (at the inner periphery of the lower half portion of) the bearing member 46a and the screw driving member 22 converts the rotation of the output gear 45a (that is, the rotor 42) into the linear movement in the direction the axis O (the elevation direction) by a screw feeding mechanism 27 including the male thread 22a and the female thread 46d. Here, the output gear 45a rotates instead of the vertical movement at a certain position in the direction of the axis O and a flat driver-shaped plate-shaped portion 22b provided at the upper end of the screw driving member 22 is inserted into a slit-shaped fitting groove 46e provided at the lower end of the output shaft 46b connected to the output gear 45a so that the rotation of the output gear 45a is transmitted to the screw driving member 22. Since the plate-shaped portion 22b provided in the screw driving member 22 slides in the direction of the axis O within the fitting groove 46e of the output shaft 46b, when the output gear 45a (the rotor 42) rotates, the output gear 45a does not move in the rotation axis direction and the screw driving member 22 moves linearly in the direction of the axis O along with the screw feeding mechanism 27. The linear movement of the screw driving member 22 is transmitted to the thrust transmission shaft 28 through a ball-shaped joint 25 including a ball 23 and a ball seat 24 fitted into a stepped fitting hole provided at the upper portion of the thrust transmission shaft 28. The connection shaft 29 connected to the thrust transmission shaft 28 is slidably inserted into (a lower small-diameter sliding portion 47a of) the stepped cylindrical valve shaft support member 47 inserted and fixed into the mounting hole 14 of the valve body 10 and the valve shaft 21 is guided by (the lower small-diameter sliding portion 47a of) the valve shaft support member 47 to move (be elevated) in the direction of the axis O. Further, a compression coil spring 26 that urges the valve shaft 21 in the valve opening direction (upward) at all times is loaded in a compression state between (an upward step surface formed between a lower small-diameter sliding portion 47a and an upper large-diameter fitting portion 47b) of the valve shaft support member 47 and (the downward step surface of) the thrust transmission shaft 28.

In addition, in the valve shaft support member 47, the upper end of the upper large-diameter fitting portion 47b is provided with a flange-shaped locking portion 47c (protruding outward). When the upper large-diameter fitting portion 47b is fitted into (the lower portion of) the mounting hole 14 and the flange-shaped locking portion 47c is sandwiched by the step portion of the mounting hole 14 and the lower end of (the fitting portion 49b of) the holder member 49 fitted into the mounting hole 14, the fitting portion is inserted and fixed into the mounting hole 14 of the valve body 10.

A male thread is formed at the outer periphery of the lower half portion of the fitting portion 49b of the holder member 49 and an O-ring 49c serving as a seal member is attached to (an annular groove formed in) the outer periphery of the upper half portion of the fitting portion 49b. When the male thread of (the fitting portion 49b of) the holder member 49 is threaded into the female thread of (the upper portion of) the mounting hole 14 provided in the valve body 10 (while sandwiching the valve shaft support member 47), the stepping motor 40 (including the mechanical paradox planetary gear reduction mechanism 45 for reducing the rotation speed of the rotor 42) is disposed above the valve body 10 (in a vertical posture).

In the stepping motor 40 with the above-described configuration, when the rotor 42 is rotated in one direction, the rotation of the rotor 42 is transmitted to the screw driving member 22 through the mechanical paradox planetary gear reduction mechanism 45 while a speed is reduced. For example, the screw driving member 22 moves downward while rotating by the screw feeding mechanism 27 including the male thread 22a of the screw driving member 22 and the female thread 46d of the bearing member 46a, the thrust transmission shaft 28 and the connection shaft 29 are pressed downward against the urging force of the compression coil spring 26 by the thrust of the screw driving member 22. Finally, the main valve body 20 provided at the front end of the connection shaft 29 sits on the valve seat 13d provided in the inlet 13c to close the inlet 13c. On the contrary, when the rotor 42 is driven to rotate in the other direction, the rotation of the rotor 42 is transmitted to the screw driving member 22 through the mechanical paradox planetary gear reduction mechanism 45 while a speed is reduced and the screw driving member 22 moves upward while rotating by the screw feeding mechanism 27. Accordingly, the thrust transmission shaft 28 and the connection shaft 29 are pulled upward by the urging force of the compression coil spring 26 and the main valve body 20 provided at the front end of the connection shaft 29 is separated from the valve seat 13d to open the inlet 13c. Accordingly, the flow rate of the fluid (the refrigerant) flowing through the inlet 13c is controlled.

<Configurations of Differential Pressure valves 50, 60, 70, and 80>

Since the differential pressure valves 50, 60, 70, and 80 (the first side portion differential pressure valve 50, the second side portion differential pressure valve 60, the first bottom portion differential pressure valve 70, and the second bottom portion differential pressure valve 80) attached to the attachment holes 15, 16, 17, and 18 have the substantially same configuration except for the formation directions of the attachment holes 15, 16, 17, and 18 and the attachment directions of the differential pressure valves 50, 60, 70, and 80 (in other words, the movement directions of the pistons 52, 62, 72, and 82 and the valve bodies 51, 61, 71, and 81) in the first embodiment, a description of a detailed structure thereof will be omitted.

However, in the second embodiment, the differential pressure valve 50 attached to the attachment hole 15 allows a fluid to flow only in a direction from the first outlet 13a to the first inlet/outlet 11 in response to a differential pressure before and after the attachment hole 15 (that is, a differential pressure between the first outlet 13a and the first inlet/outlet 11), more specifically, at a time point in which a pressure near the first outlet 13a is higher than a pressure near the first inlet/outlet 11 by a predetermined value or more and (the valve body 51 in) the differential pressure valve 50 can be selectively located at an opening position of allowing the inflow of a fluid in a direction from the first outlet 13a to the first inlet/outlet 11 and a closing position of prohibiting (preventing) the inflow of a fluid in a direction from the first outlet 13a to the first inlet/outlet 11 in response to the differential pressure between the first outlet 13a and the first inlet/outlet 11.

Further, also in the differential pressure valve 60 attached to the attachment hole 16, similarly to the differential pressure valve 50, a fluid flows only in a direction from the second outlet 13b to the second inlet/outlet 12 in response to a differential pressure before and after the attachment hole 16 (that is, a differential pressure between the second outlet 13b and the second inlet/outlet 12), more specifically, a time point in which a pressure near the second outlet 13b is higher than a pressure near the second inlet/outlet 12 by a predetermined value or more and (the valve body 61 of) the differential pressure valve 60 can be selectively located at an opening position of allowing the inflow of a fluid in a direction from the second outlet 13b to the second inlet/outlet 12 and a closing position of prohibiting (preventing) the inflow of a fluid in a direction from the second outlet 13b to the second inlet/outlet 12 in response to the differential pressure between the second outlet 13b and the second inlet/outlet 12.

Further, also in the differential pressure valve 70 attached to the attachment hole 17, similarly to the differential pressure valve 50, a fluid flows only in a direction from the first inlet/outlet 11 to the inlet 13c in response to a differential pressure before and after the attachment hole 17 (that is, a differential pressure between the first inlet/outlet 11 and the inlet 13c), more specifically, a time point in which a pressure near the first inlet/outlet 11 is higher than a pressure near the inlet 13c by a predetermined value or more and (the valve body 71 in) the differential pressure valve 70 can be selectively located at an opening position of allowing the inflow of a fluid in a direction from the first inlet/outlet 11 to the inlet 13c and a closing position of prohibiting (preventing) the inflow of a fluid in a direction from the first inlet/outlet 11 to the inlet 13c in response to the differential pressure between the first inlet/outlet 11 and the inlet 13c.

Further, also in the differential pressure valve 80 attached to the attachment hole 18, similarly to the differential pressure valve 50, a fluid flows only in a direction from the second inlet/outlet 12 to the inlet 13c in response to a differential pressure before and after the attachment hole 18 (that is, a differential pressure between the second inlet/outlet 12 and the inlet 13c), more specifically, a time point in which a pressure near the second inlet/outlet 12 is higher than a pressure near the inlet 13c by a predetermined value or more and (the valve body 81 in) the differential pressure valve 80 can be selectively located at an opening position of allowing the inflow of a fluid in a direction from the second inlet/outlet 12 to the inlet 13c and a closing position of prohibiting (preventing) the inflow of a fluid in a direction from the second inlet/outlet 12 to the inlet 13c in response to the differential pressure between the second inlet/outlet 12 and the inlet 13c.

<Operation of Electric Valve 2>

In the electric valve 2 with the above-described configuration, when a fluid flows in a direction (one direction) from the first inlet/outlet 11 (the high pressure side) to the second inlet/outlet 12 (the low pressure side), a pressure near the first inlet/outlet 11 becomes higher than a pressure near the first outlet 13a (the main valve chamber 13) or a pressure near the inlet 13c (the main valve chamber 13) and a pressure near the second inlet/outlet 12 becomes lower than a pressure near the second outlet 13b (the main valve chamber 13) or a pressure near the inlet 13c (the main valve chamber 13). For that reason, (the valve body 61 in) the differential pressure valve 60 provided in the attachment hole 16 and (the valve body 71 in) the differential pressure valve 70 provided in the attachment hole 17 are set to the opening position and (the valve body 51 in) the differential pressure valve 50 provided in the attachment hole 15 and (the valve body 81 in) the differential pressure valve 80 provided in the attachment hole 18 are set to the closing position.

Thus, a fluid (a refrigerant) introduced from the first inlet/outlet 11 flows into the inlet 13c formed as a vertical hole through the lower portion of the vertical hole 19a, the inside of the attachment hole 17 (the inside of the cylindrical portion 79a of the valve body holder 79 and the penetration hole 78), and the slant hole 19d. Also, when the inlet 13c is opened, the fluid flows to the second inlet/outlet 12 through the inside of the mounting hole 14 (the main valve chamber 13), the second outlet 13b formed as a lateral hole, the inside of the attachment hole 16 (the inside of the cylindrical portion 69a of the valve body holder 69 and the penetration hole 68), and the upper portion of the vertical hole 19b (a state shown in FIG. 3).

Meanwhile, when a fluid flows in a direction (the other direction) from the second inlet/outlet 12 (the high pressure side) to the first inlet/outlet 11 (the low pressure side), a pressure near the first inlet/outlet 11 becomes lower than a pressure near the first outlet 13a (the main valve chamber 13) or a pressure near the inlet 13c (the main valve chamber 13) and a pressure near the second inlet/outlet 12 becomes higher than a pressure near the second outlet 13b (the main valve chamber 13) or a pressure near the inlet 13c (the main valve chamber 13). For that reason, (the valve body 61 in) the differential pressure valve 60 provided in the attachment hole 16 and (the valve body 71 in) the differential pressure valve 70 provided in the attachment hole 17 are set to the closing position and (the valve body 51 in) the differential pressure valve 50 provided in the attachment hole 15 and (the valve body 81 in) the differential pressure valve 80 provided in the attachment hole 18 are set to the opening position.

Thus, a fluid (a refrigerant) introduced from the second inlet/outlet 12 flows into the inlet 13c formed as a vertical hole through the lower portion of the vertical hole 19b, the inside of the attachment hole 18 (the inside of the cylindrical portion 89a of the valve body holder 89 and the penetration hole 88), and the slant hole 19e. Also, when the inlet 13c is opened, the fluid flows to the first inlet/outlet 11 through the inside of the mounting hole 14 (the main valve chamber 13), the first outlet 13a formed as a lateral hole, the inside of the attachment hole 15 (the inside of the cylindrical portion 59a of the valve body holder 59 and the penetration hole 58), and the upper portion of the vertical hole 19a (a state shown in FIG. 4).

In this way, also in the control valve (the electric valve) 2 of the embodiment, similarly to the electromagnetic valve 1 of the first embodiment, since the plurality of differential pressure valves (the check valves) 50, 60, 70, and 80 are disposed to be assembled in the valve body 10 so that the fluid pressure acting on the main valve body 20 disposed inside the main valve chamber 13 has the same direction (down→lateral) in the flow of both directions including one direction from the first inlet/outlet 11 to the second inlet/outlet 12 through the main valve chamber 13 and the other direction from the second inlet/outlet 12 to the first inlet/outlet 11 through the main valve chamber 13, it is possible to prevent a problem in which the main valve body 20 performs an operation (an opening/closing operation) different from the control due to the differential pressure (the fluid pressure) acting on the main valve body 20, for example, even when a pressure difference between the first inlet/outlet 11 and the second inlet/outlet 12 is large. For that reason, it is possible to ensure controllability in both flows without increasing the number of parts.

Further, in the embodiment, since the valve bodies 71 and 81 of the differential pressure valves 70 and 80 are moved in the vertical direction (that is, the same direction as the movement direction of the main valve body 20) and the valve bodies 51 and 61 of the differential pressure valves 50 and 60 are moved in the lateral direction (that is, a direction orthogonal to the movement direction of the main valve body 20) (in an opposed state), there is an effect that the valve body 10 can be decreased in size and the configuration of the electric valve 2 can be simplified.

Further, in the above-described first and second embodiments, an example of a direct action type using the electromagnetic actuator 30 or the stepping motor 40 as the elevation drive source for elevating the main valve body 20 has been described, but it is needless to mention that the invention can be also applied to various valve devices such as a pilot valve for driving (elevating) a main valve body using, for example, a pressure difference of a fluid.

EXPLANATIONS OF LETTERS OR NUMERALS

1: electromagnetic valve (first embodiment of control valve)
2: electric valve (second embodiment of control valve)
10: valve body
11: first inlet/outlet
12: second inlet/outlet
13: main valve chamber
13a: first side portion opening
13b: second side portion opening
13c: bottom portion opening
14: mounting hole
15, 16, 17, 18: attachment hole
19a, 19b: vertical hole
19c: lateral hole
19d, 19e: slant hole
20: main valve body
21: valve shaft
27: screw feeding mechanism
30: electromagnetic actuator (elevation drive source) (first embodiment)
39: holder member
40: stepping motor (elevation drive source) (second embodiment)
45: mechanical paradox planetary gear reduction mechanism
47: valve shaft support member
48: can
49: holder member
50: differential pressure valve (first side portion differential pressure valve)
51: valve body
60: differential pressure valve (second side portion differential pressure valve)
61: valve body
70: differential pressure valve (first bottom portion differential pressure valve)
71: valve body
80: differential pressure valve (second bottom portion differential pressure valve)
81: valve body

The invention claimed is:

1. A control valve comprising:
a valve body which is provided with a main valve chamber and first and second inlet/outlets and in which a bottom portion opening and first and second side portion openings are opened to the main valve chamber;
a main valve body which is disposed in the main valve chamber to be elevatable relative to the bottom portion opening in order to control a flow rate of a fluid flowing in the bottom portion opening; and
an elevation drive source which elevates the main valve body relative to the bottom portion opening,
wherein differential pressure valves operated in response to a front/rear differential pressure are respectively disposed between the first inlet/outlet and the first side portion opening, between the second inlet/outlet and the second side portion opening, between the first inlet/outlet and the bottom portion opening, and between the second inlet/outlet and the bottom portion opening inside the valve body so that a fluid pressure acting on the main valve body becomes the same in a flow in both directions including one direction from the first inlet/outlet to the second inlet/outlet through the main valve chamber and the other direction from the second inlet/outlet to the first inlet/outlet through the main valve chamber.

2. The control valve according to claim 1,
wherein a first side portion differential pressure valve allowing a fluid to flow only in a direction from the first inlet/outlet to the first side portion opening or the opposite direction in response to a differential pressure between the first inlet/outlet and the first side portion opening is disposed between the first inlet/outlet and the first side portion opening inside the valve body, wherein a second side portion differential pressure valve allowing a fluid to flow only in a direction from the second inlet/outlet to the second side portion opening or the opposite direction in response to a differential pressure between the second inlet/outlet and the second side portion opening is disposed between the second inlet/outlet and the second side portion opening inside the valve body, wherein a first bottom portion differential pressure valve allowing a fluid to flow only in a direction from the bottom portion opening to the first inlet/outlet or the opposite direction in response to a differential pressure between the first inlet/outlet and the bottom portion opening is disposed between the first inlet/outlet and the bottom portion opening inside the valve body, and wherein a second bottom portion differential pressure valve allowing a fluid to flow only in a direction from the bottom portion opening to the second inlet/outlet or the opposite direction in response to a differential pressure between the second inlet/outlet and the bottom portion opening is disposed between the second inlet/outlet and the bottom portion opening inside the valve body.

3. A control valve comprising:

a valve body which is provided with a main valve chamber and first and second inlet/outlets and in which an outlet is opened to a bottom portion of the main valve chamber and first and second inlets are opened to a side portion of the main valve chamber;

a main valve body which is disposed in the main valve chamber to be elevatable relative to the outlet in order to control a flow rate of a fluid flowing in the outlet; and an elevation drive source which elevates the main valve body relative to the outlet, wherein a first side portion differential pressure valve allowing a fluid to flow only in a direction from the first inlet/outlet to the first inlet in response to a differential pressure between the first inlet/outlet and the first inlet is disposed between the first inlet/outlet and the first inlet inside the valve body, a second side portion differential pressure valve allowing a fluid to flow only in a direction from the second inlet/outlet to the second inlet in response to a differential pressure between the second inlet/outlet and the second inlet is disposed between the second inlet/outlet and the second inlet inside the valve body, a first bottom portion differential pressure valve allowing a fluid to flow only in a direction from the outlet to the first inlet/outlet in response to a differential pressure between the outlet and the first inlet/outlet is disposed between the outlet and the first inlet/outlet inside the valve body, and a second bottom portion differential pressure valve allowing a fluid to flow only in a direction from the outlet to the second inlet/outlet in response to a differential pressure between the outlet and the second inlet/outlet is disposed between the outlet and the second inlet/outlet inside the valve body so that a fluid pressure acting on the main valve body becomes the same in a flow in both directions including one direction from the first inlet/outlet to the second inlet/outlet through the main valve chamber and the other direction from the second inlet/outlet to the first inlet/outlet through the main valve chamber.

4. The control valve according to claim 3, wherein valve bodies of the first and second side portion differential pressure valves are moved in the same direction as the movement direction of the main valve body and valve bodies of the first and second bottom portion differential pressure valves are moved in a direction orthogonal to the movement direction of the main valve body.

5. A control valve comprising:

a valve body which is provided with a main valve chamber and first and second inlet/outlets and in which an inlet is opened to a bottom portion of the main valve chamber and first and second outlets are opened to a side portion of the main valve chamber;

a main valve body which is disposed in the main valve chamber to be elevatable relative to the inlet in order to control a flow rate of a fluid flowing in the inlet; and an elevation drive source which elevates the main valve body relative to the inlet, wherein a first bottom portion differential pressure valve allowing a fluid to flow only in a direction from the first inlet/outlet to the inlet in response to a differential pressure between the first inlet/outlet and the inlet is disposed between the first inlet/outlet and the inlet inside the valve body, a second bottom portion differential pressure valve allowing a fluid to flow only in a direction from the second inlet/outlet to the inlet in response to a differential pressure between the second inlet/outlet and the inlet is disposed between the second inlet/outlet and the inlet inside the valve body, a first side portion differential pressure valve allowing a fluid to flow only in a direction from the first outlet to the first inlet/outlet in response to a differential pressure between the first outlet and the first inlet/outlet is disposed between the first outlet and the first inlet/outlet inside the valve body, and a second side portion differential pressure valve allowing a fluid to flow only in a direction from the second outlet to the second inlet/outlet in response to a differential pressure between the second outlet and the second inlet/outlet is disposed between the second outlet and the second inlet/outlet inside the valve body so that a fluid pressure acting on the main valve body becomes the same in a flow of both directions including one direction from the first inlet/outlet to the second inlet/outlet through the main valve chamber and the other direction from the second inlet/outlet to the first inlet/outlet through the main valve chamber.

6. The control valve according to claim 5, wherein valve bodies of the first and second bottom portion differential pressure valves are moved in the same direction as the movement direction of the main valve body and valve bodies of the first and second side portion differential pressure valves are moved in a direction orthogonal to the movement direction of the main valve body.

* * * * *